US00RE34006E

United States Patent [19]

Cage et al.

[11] E Patent Number: Re. 34,006

[45] Reissued Date of Patent: Jul. 28, 1992

[54] ANGULAR RATE SENSOR

[76] Inventors: Donald R. Cage, 6 Placer Ave.; Michael J. Zolock, 1425 Missouri Ave., both of Longmont, Colo. 80501

[21] Appl. No.: 640,264

[22] Filed: Jan. 11, 1991

Related U.S. Patent Documents

Reissue of:

[64] Patent No.: 4,802,364
Issued: Feb. 7, 1989
Appl. No.: 55,643
Filed: May 29, 1987

[51] Int. Cl.[5] ..... G01P 9/04

[52] U.S. Cl. ..... 73/505

[58] Field of Search ..... 73/505

[56] References Cited

U.S. PATENT DOCUMENTS

| | | | |
|---|---|---|---|
| Re. 22,409 | 12/1943 | Lyman | 73/505 |
| Re. 32,931 | 5/1989 | Staudte . | |
| 2,544,646 | 3/1951 | Barnaby et al. . | |
| 2,974,530 | 3/1961 | Jaouen | 73/505 |
| 3,127,775 | 4/1964 | Hansen et al. | 73/505 |
| 3,504,554 | 4/1970 | Taylor . | |
| 3,789,673 | 2/1974 | Berlin et al. | 73/505 |
| 3,839,915 | 10/1974 | Schlitt . | |
| 3,903,747 | 9/1975 | Johnson | 73/505 |
| 4,019,391 | 4/1977 | Ljung . | |
| 4,264,838 | 4/1981 | Jacobson . | |
| 4,267,731 | 5/1981 | Jacobson | 73/505 |
| 4,524,619 | 6/1985 | Staudte . | |
| 4,538,461 | 9/1985 | Juptner et al. . | |
| 4,654,663 | 3/1987 | Alsenz et al. | 73/505 |
| 4,671,112 | 6/1987 | Kimura et al. | 73/505 |
| 4,674,331 | 6/1987 | Watson . | |
| 4,759,220 | 7/1988 | Burdess et al. . | |
| 4,884,446 | 12/1989 | Ljung . | |
| 4,899,587 | 2/1990 | Staudte . | |

*Primary Examiner*—John E. Chapman
*Attorney, Agent, or Firm*—Dorr, Carson, Sloan & Peterson

[57] ABSTRACT

An apparatus for measuring rate of turn employing a vibrating tuning fork type sensor in which the tynes vibrate in a coaxial manner. This arrangement eliminates reaction torques and forces at the base of the tuning fork which allows the tynes to freely deflect into an elliptical pattern during an input turn rate. Sensors are employed which monitor the shape of this elliptical pattern, this shape being proportional to angular turn rate.

22 Claims, 3 Drawing Sheets

ANGULAR RATE SENSOR

Matter enclosed in heavy brackets [ ] appears in the original patent but forms no part of this reissue specification; matter printed in italics indicates the additions made by reissue.

BACKGROUND OF THE INVENTION

In the art of vibrating type angular rate sensors it is known that a vibrating element subjected to an angular turn rate about certain axes will experience resultant forces and/or deflections which are an indication of the magnitude of the input turn rate.

Several problems associated with the implementation of this effect have kept this type of instrument from seeing as widespresd use as the spinning rotor type rate sensor despite its advantages of simplicity, elimination of bearings, cost, and longer life.

One problem associated with attaining accurate measurements from a vibrating element angular rate sensor is that of accurately measuring or controlling the amplitude of vibration. Lyman, in U.S. Pat. No. Re. 22,409, teaches that the combination of forced vibration action with an applied input turn rate causes resultant forces which deflect the vibration pattern to an elliptical path. With the length of the major axis of the ellipse held constant, the width of the minor axis of the ellipse is a function of the input rate of turn. Since the resultant forces/deflections are directly related to vibration amplitude as well as the input turn rate, amplitude must be at least as accurately controlled or "measured" as the stated accuracy of the complete system, typically within 0.01% or better.

It is one object of this invention to disclose a means by which resultant signals are generated that are directly related to input turn rate and essentially independent of vibration amplitude. This reduces the importance of amplitude control several orders of magnitude to that required by other design parameters such as stress levels, vibrational clearances, etc. Typically, 10% accuracy is then adequate for these other design parameters.

Another problem associated with vibrating element angular rate sensors has been creating a vibrating element that can be fixedly attached to a frame "for mounting purposes" without motion or forces in the attachment or the frame interfering with the accuracy of the resultant measured signals. Traditionally, the primary method of attaining resultant signals from a vibrating element has been to simply fixedly attach the element to a "rigid frame" and measure the resultant forces/deflections with respect to the frame either directly or with implied respect depending on the type of pickoffs used. Since the resultant forces are transmitted directly to the frame, error signals can be generated due to motion of the frame caused by these applied forces or from external sources.

*These error signals are due to the fact that the vibrating elements are not balanced for both the driven and reaction directions of vibration. A balanced structure precludes forces from entering or leaving the system comprising the vibrating elements and thereby isolates the vibrating elements from outside vibration and interference.*

Examples of geometrics of this nature would be the traditional tuning fork type (ref. Lyman U.S. Pat. No. Re. 22,409), the cantilever beam type (ref Jacobson U.S. Pat. No. 4,267,731), the vibrating wire type (ref Johnson U.S. Pat. No. 3,903,747), etc. A previous method of dealing with the resultant forces without transferring them directly to the frame has been to attach a second and similar vibrating system to the first vibrating system whereby forces/deflections from either the forced vibration action or as a resultant from an input turn rate from one system are counter opposed by the other, resulting in a "node" to which the frame attachment is made.

This method unnecessarily doubles the complexity of the unit thereby increasing cost and unreliability. Also, the "node" defined by this method is typically a thin plane to which only a tenuous attachment can be made resulting in sensitivities in low levels of vibration and accelerations about the attachment.

It is a second object of this invention to disclose a means of creating a vibrating element angular rate sensor that can be rigidly attached to a frame "for mounting purposes" without motion or forces in the attachment or the frame causing errors in the resultant measurement signals.

SUMMARY OF THE INVENTION

The present invention discloses several embodiments of a means for attaining resultant measurement signals that are directly related to input angular turn rate yet are essentially independent of the amplitude of vibration of the vibrating element.

The present invention also discloses several embodiments of a vibrating element type angular rate sensor whose geometries are such that they can be rigidly attached to a frame, for mounting purposes, whereby motion of the frame and forces, vibrations, etc., transmitted to or from the frame through the attachment cause essentially no errors in the resultant measurement signals.

Since the width of the minor axis of the ellipse is proportional to the input angular turn rate times the amplitude of vibration, the ratio of the width to length, "the aspect ratio", of the elliptical pattern is a constant for a given input turn rate regardless of the amplitude of vibration.

It can be shown that pickoffs oriented with their sensitive axes disposed at angles "both plus and minus" between the major and minor axis of the elliptical pattern can generate signals that are phase shifted from each other by an amount proportional to the aspect ratio of the elliptical pattern.

Two embodiments are disclosed that describe means for attaining measurement signals that are proportional to the aspect ratio of this elliptical pattern and therefore proportional to the input turn rate independent of the amplitude of vibration.

The vibrating element of the present invention is in the form of a tuning fork in that it is composed of two mass/spring tynes cantilever mounted from a common base. The tynes of the tuning fork are in fact or in effect coaxial and parallel with the input axis (axis that is sensitive to turn rate) of the assembly.

Each tyne is constructed so that for a given amplitude of vibration in the forced direction they will have essentially identical natural bending frequencies and resultant shear and moment forces at their attachment to the common base.

Likewise, orthogonal to the forced direction in the resultant force/deflection direction, each tyne is constructed to have essentially [ident] *identical* natural bending frequencies and at a given amplitude of deflection essentially equal shear and moment forces at their attachment to the common base. The natural bending frequency in the forced direction can be designed to be different than the natural bending frequency in the resultant force direction which is 90° from the forced vibration direction.

*When these conditions are met, the tynes are said to be balanced.*

The area on the common base coaxial with and within the area of the tynes of the tuning fork defines a node that can be rigidly attached to a frame without detrimentally affecting the vibrational characteristics of the assembly.

DETAILED DESCRIPTION OF THE INVENTION

Figure 1:
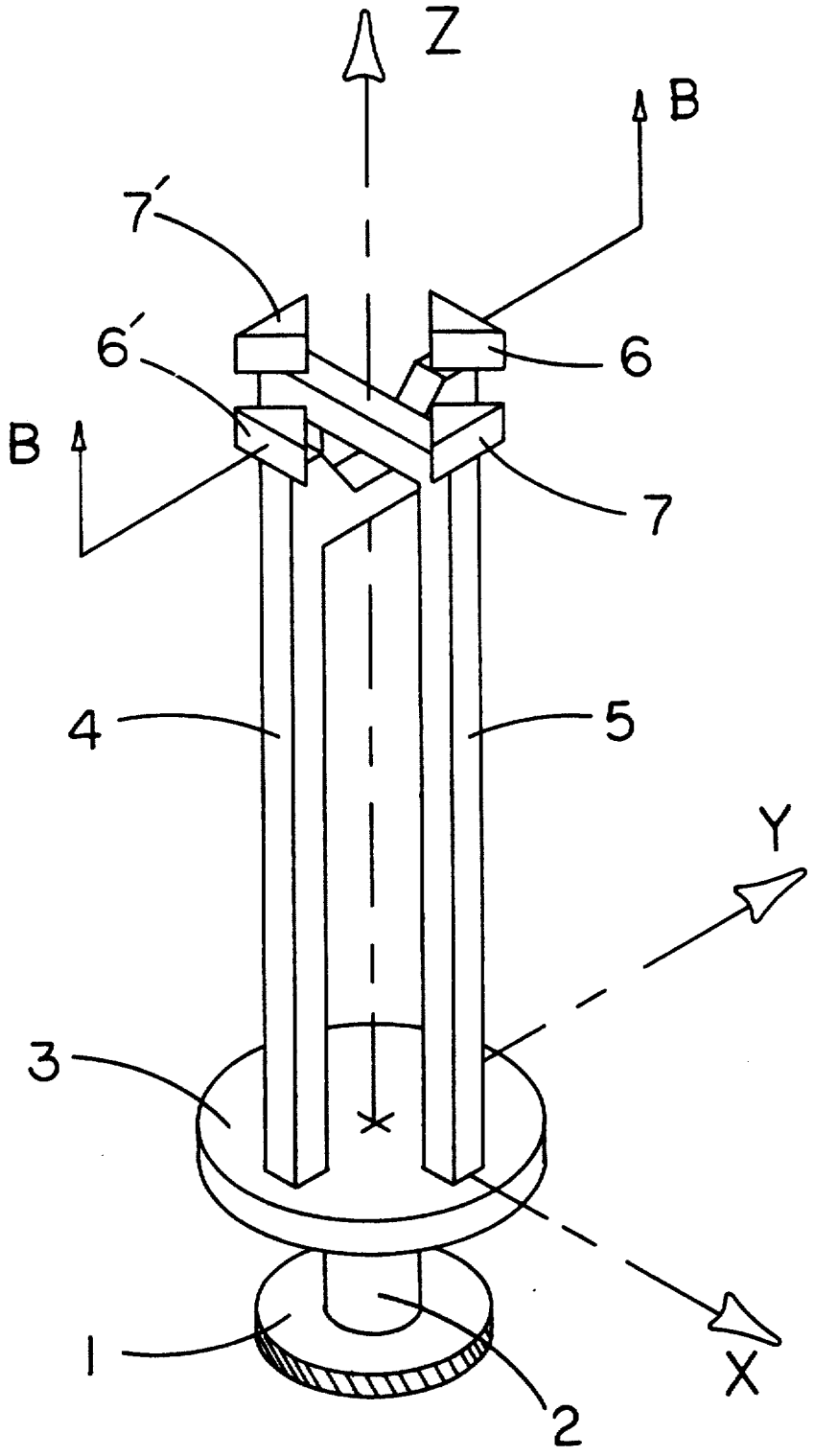
FIG. 1 is a perspective view of a turn rate sensor according to the present invention.

Referring to the drawings, FIGS. 1, 2, 3 and 4 depict various views of the preferred embodiment of the turn rate sensor.

In general, the invention is comprised of a tuning fork whereby the two tynes of the tuning fork are designed and arranged to be cantilever mounted from a common base in a coaxial fashion so that the reaction forces transmitted to the common base by one tyne from either the forced vibration action or as a result of input turn rate are directly counter opposed by equal and opposite forces from the other tyne.

Figure 2:
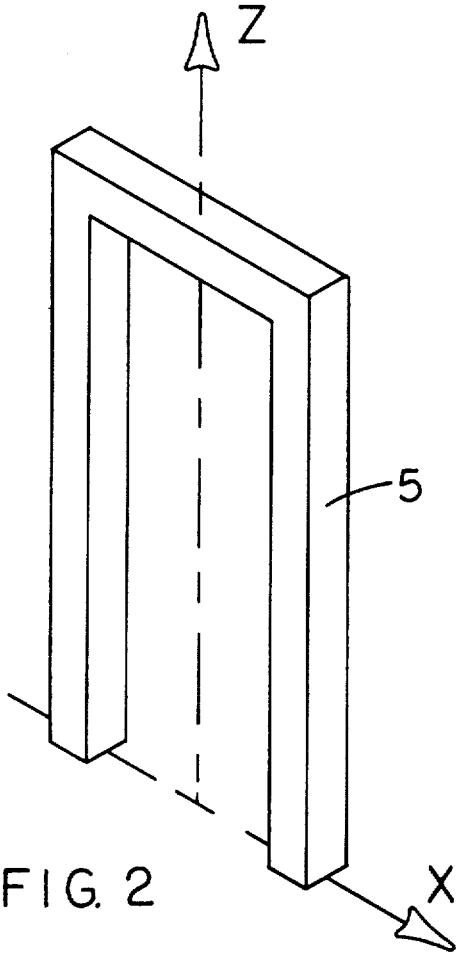
FIG. 2 is a perspective view of one tyne of the embodiment of FIG. 1.
Figure 3:
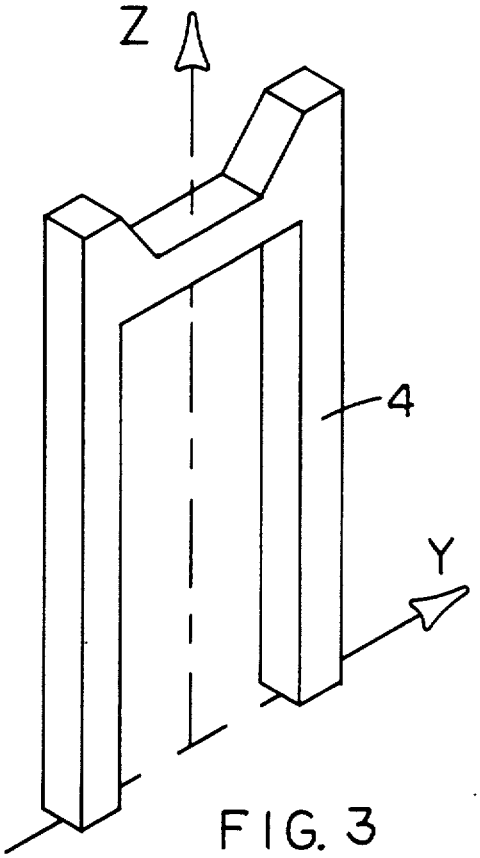
FIG. 3 is a perspective view of one tyne of the embodiment of FIG. 1 which opposes the tyne in FIG. 2.

For the embodiment of FIG. 1, this coaxial arrangement is accomplished by configuring tyne 5 and tyne 4 as shown in FIGS. 2 and 3. *As shown on FIG. 1, tynes 4 and 5 are substantially U-shaped with the open ends of the legs of the tynes being affixed to base 3.*

Tyne 4 lies in the y-z plane and is fixedly attached to the common base 3 to so that its longitudinal axis is coincident with the z axis of the assembly.

Similarly, tyne 5 lies in the x-z plane and is fixedly attached to common base 3 so that its longitudinal axis is coincident with the z axis of the assembly and with the longitudinal axis of tyne 4.

Tynes 4 and 5 are designed so they can freely vibrate either in the x or y direction without interferring with one another. The design of tynes 4 and 5 is further constrained by the requirement that at a given amplitude of vibration in opposition to one another in the y direction, the reaction forces "both shear and moment" from each tyne 4 and 5 onto the common base 3 shall be substantially equal in magnitude, opposite in direction and, due to the coaxial arrangement of the tynes, shall essentially cancel said reaction forces out.

Similarly, at a given amplitude of vibration in opposition to one another in the x direction the reaction forces, both shear and moment, from each tyne 4 and 5 onto the common base 3 shall be substantially equal in magnitude, opposite in direction, and, due to the coaxial arrangement of the tynes, shall essentially cancel said reaction forces out.

*This results in a system that is balanced for both the driven and reaction direction of vibration.*

With this arrangement a substantial "node" is created on the common base 3 coaxial with the z axis whereby a mounting pedestal 2 can rigidly affix the common base 3 to a frame 1, for mounting purposes, without affecting the vibrational characteristics of the tuning fork.

In the preferred embodiment of FIG. 1, both the common base 3 and tynes 4 and 5 are made of 300 series stainless steel and are fixedly attached to each other by vacuum furnace brazing.

Many other materials and means for attachment have been successfully utilized or contemplated such as brass, aluminum, glass, quartz, piezoelectric ceramics, etc., and welding, brazing, etc.

Figure 4:
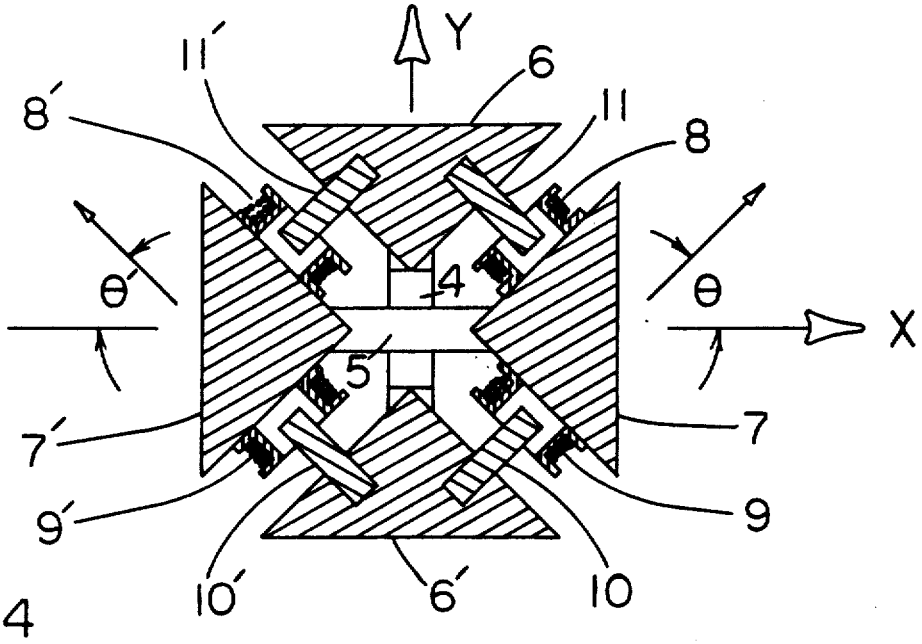
FIG. 4 is a cross sectional view taken along line B—B in FIG. 1 showing the arrangement of sensors.

Referring now to FIGS. 1 and 4, in the preferred embodiment, tynes 4 and 5 of the tuning fork are instrumented with means for forcing the vibration of the tynes in the y direction. This is done by attaching forcing magnets 11 and 11′ to mounting block 6 on tyne 4 and forcing coils 8 and 8′ to mounting blocks 7 and 7′ on tyne 5. The coils are electrically excited at a frequency that is essentially equal to the natural frequency of vibration in the y direction and in a manner so that the net resultant force on tynes 4 and 5 is essentially parallel to the y axis and directed through the z axis of the assembly.

Tynes 4 and 5 are further instrumented with sensing magnets 10 and 10′ on mounting block 6′ and sensing coils 9 and 9′ on mounting blocks 7 and 7′. These sensors are so arranged so that their "sensitive axes" are disposed at an angle $\theta$ and $\theta'$ between the x direction and the y direction and parallel to the x-y plane.

In this configuration and defining motion of the magnet 10 or 10′ toward its associated coil 9 or 9′ as generating positive in phase voltages, relative motion between tynes 4 and 5 will have the following result:

Opposing vibratory motion in the y direction between tynes 4 and 5 will essentially cause sinusoidal voltages to be generated in coils 9 and 9′ that are similar in magnitude and directly in phase with each other.

Similarly, opposing vibratory motion in the x direction between tynes 4 and 5 will cause essentially sinusoidal voltages to be generated that are similar in magnitude but opposite in phase with each other, "180° out of phase."

When tynes 4 and 5 are forced to vibrate in the y direction and the assembly experiences an angular turn rate about the z axis, it is known in the art that resultant forces will be generated that will cause the vibratory pattern of tynes 4 and 5 to be deflected into an elliptical shape.

In the art of vibrating type angular rate sensors it is also known that for a constant amplitude of forced vibration, the width of the elliptical pattern thus produced is proportionally related to the angular turn rate. Therefore, the ratio of the width to length, "aspect ratio", of the elliptical pattern is proportionally related to the magnitude of the input angular turn rate independent of vibration amplitude.

This elliptical motion can be described as the sum of sinusoidal motion in the y direction plus the sinusoidal motion in the x direction which is 90° phase shifted from the motion in the y direction.

Since the sensing coils 9 and 9' are oriented at an angle $\theta$ and $\theta'$ between the x and y directions, the voltages generated in these coils due to the elliptical motion can be described as follows:

The velocity in the y direction can be described as $\dot{y}$ where $$\dot{y} = wL \text{ Cosine } wt \quad (1)$$

and the velocity in the x direction can be described as $\dot{x}$ where $$\dot{x} = wW \text{ Sine } wt \quad (2)$$

where

L = the length of the elliptical motion in the y direction divided by 2

W = the width of the elliptical motion in the x direction divided by 2 w = frequency of the elliptical vibration.

The resultant signal S1 in sensing coil 9 will be the sum of these two velocities times their component values determined from the angle $\theta$, times a proportionality factor "K" determined from geometric constants of the sensors.

$$S1 = K[(\dot{y}) \text{ Sine } \theta + (\dot{x}) \text{ Cosine } \theta] \quad (3)$$

substituting from equations 1 and 2

$$S1 = K\ (wL \text{ Cosine } wt) \text{ Sine } \theta + K\ (wW \text{ Sine } wt) \text{ Cosine } \theta \quad (4)$$

Similarly, the resultant signal S2 in sensing coil 9' will be the same as S1 except that since motion in the x direction causes out of phase signals in coils 9 and 9' as described earlier, the sign of the second term describing x direction motion is reversed.

$$S2 = [\,]K[(\dot{y}) \text{ Sine } \theta' + (-\dot{x}) \text{ Cosine } \theta'] \quad (5)$$

$$S2 = K\ (wL \text{ Cosine } wt) \text{ Sine } \theta' + K\ (-wW \text{ Sine } wt) \text{ Cosine } \theta' \quad (6)$$

Mathematically, these equations are equivalent to $$S1 = C \text{ Cosine } (wt - \phi) \quad (7)$$

where $A = (K)\ wL \text{ Sine } \theta$ $B = (K)\ wW \text{ Cosine } \theta$ $C = (A^2 + B^2)^{\frac{1}{2}}$ $\phi = \text{arc Tangent } (B/A)$ Therefore $$\text{Tangent } [\phi 32]\ \phi = W/L \text{ Cotangent } \theta \quad (8)$$

and $$[S2 = C' - \text{Cosine } (wt - \theta') \quad (9)]$$

$$S2 = C' \text{ Cosine } (wt - \phi') \quad (9)$$

where $A' = (K)wL \text{ Sine } \theta'$ $B' = -(K)wW \text{ Cosine } \theta'$ $C' = [(A')^2 + (B')^2]^{\frac{1}{2}}$ $\phi' = \text{arc Tangent } (B'/A')$ Therefore, $$\text{Tangent } \phi' = -W/L \text{ Cotangent } [\phi'] \ \theta' \quad (10)$$

Where W/L is the "aspect ratio" of the ellipse and Cotangent $\theta$ and Cotangent $\theta'$ are constants for a given geometry, the tangent of these phase angles $\phi$ and $\phi'$ are proportionally related therefore to the aspect ratio of the elliptical motion W/L and therefore proportional to the angular turn rate independent of the amplitude of vibration.

It can be seen in equations 8 and 10 that the resultant phase angles [$\phi$and] $\phi$ *and* $\phi'$ can be drastically affected by changes in the angles $\theta$ and $\theta'$ of the sensitive axes of the sensors. These angles can therefore be adjusted to enhance desired performance characteristics of a particular design.

*It can be seen from the above that signals S1 and S2 are phase shifted from each other by an amount that is proportional to the angular turn rate of the apparatus comprising the disclosed turn rate sensor.*

Signal S1 and S2 are then compared for the determination of the phase angles $\phi$ and $\phi'$. This can be accomplished by a variety of phase detection circuits, methods or devices that are commercially available for this purpose.

Likewise, the tangents of these angles are then determined and summed. Resultant output signals can be generated proportional to this value as an accurate indication of angular turn rate. Since the tangent of a small angle nearly equals the angle itself, the phase angles $\phi$ and $\phi'$ once determined, can be used directly as a good approximation of turn rate providing the error incurred by this simplification is of an acceptable magnitude for a particular design.

Figure 5:
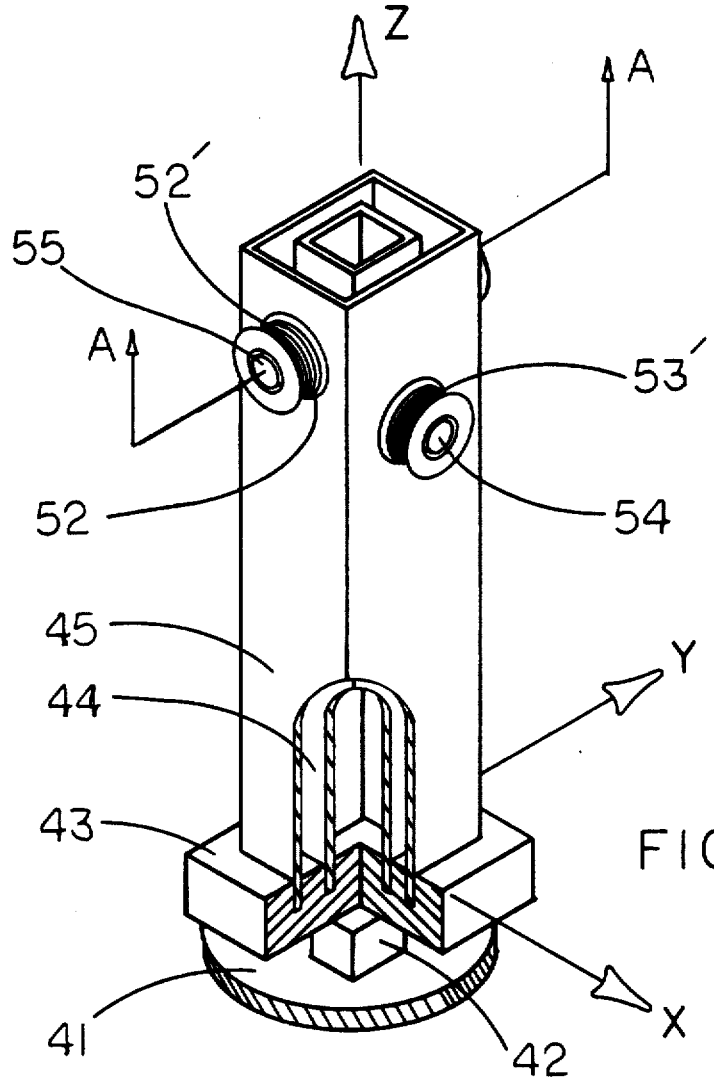
FIG. 5 is a perspective view of a turn rate sensor according to the present invention using a different tyne shape and sensor arrangement than the embodiment of FIG. 1.

FIG. 5 depicts another embodiment of the present invention. As with the embodiment of FIG. 1, FIG. 5 utilizes axially concentric tynes 44 and 45 cantilever mounted from a common base 43.

The design of tynes 44 and 45 is constrained by the requirement that at a given amplitude of vibration in opposition to one another in the y direction, the resultant forces, both shear and moment, from each tyne 44 and 45 onto the common base 43, shall be substantially equal in magnitude, opposite in direction, and due to the coaxial arrangement, shall essentially cancel each other out.

Similarly, at a given amplitude of vibration in opposition to one another in the x direction, the resultant forces, both shear and moment, from each tyne 44 and 45 onto other common base 43 shall be substantially equal in magnitude, opposite in direction and, due to the coaxial arrangement, shall essentially cancel each other out.

As with the embodiment of FIG. 1 with this arrangement a substantial "node" is created on the common base 43 whereby a mounting pedestal 42 can rigidly affix the common base 43 to a frame 41 for mounting purposes without affecting the vibrational characteristics of the tuning fork.

Figure 6:
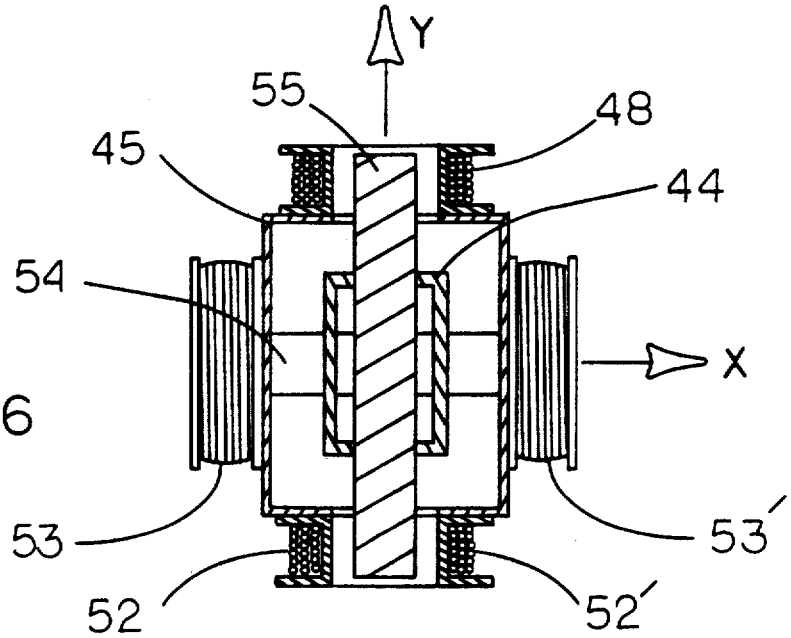
FIG. 6 is a cross sectional view along line A—A in FIG. 5 showing the arrangement of sensors.

Referring now to FIGS. 5 and 6, tyne 44 is instrumented with two magnets 54 and 55. Tyne 45 is instrumented with corresponding coils.

Coil 48 is disposed in the magnetic field at one end of magnet 55 and is used for forcing the tuning fork vibration in the y direction. Coils 52 and 52' are bifilar [would] *wound* together and disposed in the magnetic field at the other end of magnet 55. These coils 52 and 52' are sensors for detecting only the y direction component of the relative velocity of the two tynes 44 and 45.

Coils 52 and 52' are bifilar [would] *wound* together so their signals S3 and S4 are substantially equal in magnitude and phase. *Since signals S3 and S4 are stated to be substantially equal in magnitude and phase, the information represented by signal S3 is obviously identical to the information represented by signal S4.*

Tyne 45 is further instrumented with x direction sensing coils 53 and 53' which are disposed in the magnetic field at either end of magnet 54 in such a manner that their signals S5 and S6 represent only the x direction component of the relative velocity of the two tynes 44 and 45.

Signal S5 is added to signal S3 to create a resultant signal S3+S5 proportionally related to the sum of y plus x direction relative velocities between tynes 44 and 45. Similarly, signal S4 is added to signal S6 to create a resultant signal S4+S6 which is proportionally related to the difference of the y minus the x direction relative velocities between tynes 44 and 45.

These resultant signals S3+S5 and S4+S6 are analogous to the resultant signals S1 and S2 of the embodiment of FIG. 1.

The angles $\theta$ and $\theta'$ of the sensitive axes of the sensors of FIG. 4 do not geometrically exist on the embodiment of FIG. 6. However, an effective angle does exist determined by the sensors relative sensitivity to motion in the x versus the y direction.

Signals S3+S5 and S4+S6 are then compared for the determination of the phase angles $\phi$ and $\phi'$. The tangent of $\phi$ plus the tangent of $\phi'$ is then determined. Resultant output signals can be generated proportional to this value as an accurate determination of angular turn rate. *It follows from equations 8 and 10 and the paragraphs subsequent thereto that each of the angles $\phi$ and $\phi'$ is, by itself, proportional to W/L (the aspect ratio of the elliptical motion of the vibrating tynes) and therefore proportional to the measured rate of turn.*

In the embodiments of FIGS. 1 through 6 the sensors described were magnets and coils which generate signals proportionally related to the relative velocity between them. It should be understood that the phase relationships described herein remain unchanged whether position, velocity [of] *or* acceleration detectors are utilized.

Therefore, many alternate types of sensors have been successfully tested or contemplated including capacitive plate position sensors, inductive position detectors, piezoelectric accelerometers, piezoelectric strain sensors, etc.

What is claimed is:

1. An apparatus for measuring rate of turn, comprising:

(A) mounting pedestal;

(B) common base mounted to said mounting pedestal;

(C) type one substantially fixed to said common base;

(D) tyne two substantially fixed to said common base such that vibration effects with said tyne one are virtually cancelled whereas said tyne one and said tyne two act as coaxial tynes of a tuning fork whereas there is virtually no movement in said mounting pedestal;

(E) drive means associated with said tyne one and said tyne two for oscillating said tyne one and aid tyne two in opposition to one another as in a tuning fork, at a selected frequency in a prescribed direction;

(F) first pickoff means for sensing relative motion of said tyne one to said tyne two whereas said first pickoff means senses a selected proportion of the motion in the driven oscillating direction as well as a selected proportion of the resultant force motion which is perpendicular to the driven oscillating direction;

(G) second pickoff means for sensing relative motion of said tyne one to said tyne two whereas said second pickoff means senses a selected proportion of the motion in the driven oscillating direction as well as a selected proportion of the motion in the resultant force direction which is perpendicular to the driven oscillating direction whereas the phase of either the said selected proportion of the motion in the resultant force direction or of said selected proportion of the motion in the driven oscillating direction is opposite to the corresponding selected proportion of said first pickoff means, for sensing any phase difference of said selected frequency related to said first pickoff means, whereas said phase difference corresponds to a measurement of rate of turn of the apparatus.

2. An apparatus according to claim 1, including detector means for measuring a phase difference between output of said first pickoff means and output of said second pickoff means at said selected frequency of oscillating said tyne one and said tyne two whereas said phase difference corresponds to a measurement of rate of turn of the apparatus.

3. An apparatus according to claim 1 wherein said first pickoff means senses essentially the same selected proportion of the motion in the driven oscillating direction as the said second pickoff means as well as essentially the same selected proportion of the motion in the force direction as the said second pickoff means, including detector means for measuring a phase difference between output of said first pickoff means and output of said second pickoff means at said selected frequency of oscillating said tyne one and said tyne two, whereas the tangent of one half the said phase difference corresponds to a measurement of the rate of turn of the said apparatus.

4. An apparatus according to claim 1, wherein said first pickoff means is comprised of a first sensing coil connected to said tyne one and a first sensing permanent magnet connected to said tyne two, said second pickoff means is comprised of a second sensing coil connected to said tyne one and a second sensing permanent magnet connected to said tyne two.

5. An apparatus for measuring rate of turn, comprising:

(A) mounting pedestal;

(B) common base mounted to said mounting pedestal;

(C) tyne one substantially fixed to said common base;

(D) tyne two substantially fixed to said common base such that vibration effects with said tyne one are virtually cancelled whereas said tyne one and said tyne two act as coaxial tynes of a tuning fork whereas there is virtually no movement in said mounting pedestal;

(E) drive means associated with said tyne one and said tyne two for oscillating said tyne one and said tyne two in opposition to one another as in a tuning fork, at a selected frequency in a prescribed direction;

(F) first pickoff means for sensing relative motion of said tyne one to said tyne two whereas said first pickoff means senses motion in the driven oscillating direction;

(G) second pickoff means for sensing relative motion of said tyne one to said tyne two whereas said second pickoff means senses a selected proportion of the motion in the driven oscillating direction as well as a selected proportion of the motion in the resultant force direction which is perpendicular to the said driven oscillating direction for sensing any phase difference of said selected frequency related to said first pickoff means, whereas the tangent of said phase difference corresponds to a measurement of rate of turn of the apparatus.

6. An apparatus according to claim 5, including detector means for measuring a phase difference between output of said first pickoff means and output of said second pickoff means at said selected frequency of oscillating said tyne one and said tyne two whereas the tangent of said phase difference corresponds to a measurement of rate of turn of the apparatus.

7. A method of measuring *a* rate of turn, comprising *the steps of:*

(A) [a vibrating element,] vibrating *an element* at a selected frequency *with* the vibratory pattern of said vibrating element being [deflected into] an elliptical pattern proportionally related to *said* rate of turn of said vibrating element;

(B) [first pickoff means for] sensing *with a first pickoff means the* motion of said vibrating element [whereas said first pickoff means senses motion] in [the] *a* driven oscillating direction;

(C) *sensing with a* second pickoff means [for sensing motion of said vibrating element whereas said second pickoff means senses] a selected proportion of the motion *of said vibrating element* in [the] *said* driven [oscillating] direction as well as a selected [proportion] *portion* of the motion *of said element* in [the resultant force] *a reaction* direction which is perpendicular to the said driven [oscillating] direction [for sensing any phase difference of said selected frequency related to said first pickoff];

(D) [detector means for] measuring a phase difference between *an* output *signal* of said first pickoff means and *an* output *signal* of said second pickoff means at said selected frequency of oscillating said vibrating element [whereas] *wherein* the tangent of said phase difference corresponds to a measurement of rate of turn of said vibrating element.

8. [A] *The* method according to claim 7, wherein [said] *the step of* vibrating *said* element [is comprised of] *comprises the step of vibrating at least two* [or more vibrating] tynes [vibrating] in opposition to each other.

9. [A] *The* method according to claim 7 wherein *the step of vibrating* said [vibrating] element [is comprised of] *comprises the step of vibrating* a single tyne cantilever mounted from a rigid base.

*10. Apparatus for measuring an angular rate of turn comprising:*

*a plurality of elongated vibratile elements,*

*drive means associated with said vibratile elements for controllably oscillating said elements in a driven direction;*

*said elements being responsive to said oscillation in said driven direction for oscillating in a reaction direction perpendicular to said driven direction by an amount controlled by an angular rate of turn of said apparatus,*

*first pickoff means responsive to said oscillation for sensing relative motion of said vibratile elements with respect to each other so that said first pickoff means senses a selected proportion of the motion of said elements in said driven direction as well as a selected proportion of a resultant motion of said elements in said reaction direction perpendicular to said driven direction;*

*said first pickoff means being responsive to said sensing for generating a first output signal,*

*second pickoff means responsive to said oscillation for sensing relative motion of said vibratile elements with respect to each other so that said second pickoff means senses a selected proportion of the motion of said elements in said driven direction as well as a selected proportion of the resultant motion of said elements in a said reaction direction perpendicular to said driven direction with the phase of said motions sensed by said first and second pickoff means in said reaction direction being opposite to each other, and*

*said second pickoff means being responsive to said sensing for generating a second output signal with said second output signal being phase shifted from said first output signal by an amount corresponding to the angular rate of turn of said apparatus.*

*11. Apparatus for measuring an angular rate of turn comprising:*

*a plurality of elongated vibratile elements;*

*a base;*

*each of said elements being affixed to said base;*

*drive means associated with said vibratile elements for oscillating said elements in opposition to one another in a driven direction;*

*said elements being responsive to said oscillation in said driven direction to oscillate in a reaction direction by an amount determined by an angular rate of turn of said apparatus,*

*said elements being affixed to said base such that vibration effects of said oscillation of said elements are canceled for both said driven direction and said reaction direction of vibration of said elements, and*

*means responsive to said oscillations for providing an output signal having a phase shift whose magnitude is indicative of said angular rate of turn of said apparatus.*

*12. Apparatus for measuring an angular rate of turn comprising:*

*a base,*

*a plurality of elongated vibratile elements,*

*drive means associated with said vibratile elements for controllably oscillating said elements in a driven direction;*

*said elements being responsive to said oscillation in said driven direction for oscillating in a reaction direction by an amount proportional to an angular rate of turn of said apparatus,*

*said elements being affixed to said base such that vibration effects of said oscillation of said elements are canceled for both said driven direction and said reaction direction of oscillation of said elements,*

*first pickoff means for sensing relative motion of said elements with respect to each other so that said first pickoff means senses a selected proportion of the motion of said elements in said driven direction as well as a selected proportion of the resultant motion of said elements in a reaction direction perpendicular to said driven direction;*

*said first pickoff means being responsive to said oscillations for generating a first output signal,*

*second pickoff means for sensing relative motion of said elements with respect to each other so that said second pickoff means senses a selected proportion of the motion of said elements in said driven direction as well as a selected proportion of the resultant motion of said elements in a said reaction direction perpendicular to said driven direction with the phase of said motions sensed by said first and second pickoff means in said reaction direction being opposite to each other, and*

*said second pickoff means being effective upon said sensing for generating a second output signal phase shifted from said first output signal by an amount corresponding to the angular rate of turn of said apparatus.*

*13. Apparatus for measuring an angular rate of turn comprising:*

*a plurality of elongated vibratile elements,*

*drive means associated with said vibratile elements for controllably oscillating said elements in a driven direction;*

*said elements being responsive to said oscillation in said driven direction for oscillating in a reaction direction perpendicular to said driven direction by an amount controlled by an angular rate of turn of said apparatus, and*

*means for generating a plurality of output signals in response to said oscillations with said output signals being phase shifted from said each other by an amount controlled by said angular rate of turn of said apparatus.*

*14. The apparatus of claim 13 wherein said apparatus further comprises a common base; and*

*wherein each of said vibratile elements has an end affixed to said common base so that the vibration effects of said oscillations are canceled for said driven and reaction directions.*

*15. The apparatus of claim 14 wherein said base is affixed to a mounting pedestal.*

*16. The apparatus of claim 13 wherein each of said elements comprises an inverted substantially U-shaped tyne having an open end portion affixed to a common base.*

*17. The apparatus of claim 16 wherein said inverted substantially U-shaped tynes share a common elongated axis parallel to legs of said inverted substantially U-shaped tynes and wherein a first one of said tynes is positioned and rotated 90 degrees about said axis from a second one of said tynes.*

*18. The apparatus of claim 13 wherein said means for generating a plurality of output signals comprises:*

*a first motion detector which senses motion of said vibratile elements in said driven direction and creates a first drive component signal;*

*a second motion detector which senses motion of said vibratile elements in said reaction direction and creates a first reaction component signal;*

*a summing means;*

*wherein said first drive component signal and said first reaction component signal are added by said summing means to generate a first pickoff signal which is phase displaced from said first drive component signal by an amount controlled by said rate of turn.*

*19. The apparatus of claim 13 wherein said means for generating a plurality of output signals comprises:*

*a first motion detector which senses motion of said vibratile elements in said driven direction and creates a first drive component signal;*

*a second motion detector which senses motion of said vibratile elements in said reaction direction and creates a first reaction component signal;*

*a summing means;*

*wherein said first drive component signal and said first reaction component signal are added by said summing means to generate a first pickoff signal;*

*a third motion detector which senses motion of said vibratile elements in said reaction direction and creates a second reaction component signal wherein said second reaction component signal is in opposite phase to said first reaction component signal;*

*a fourth motion detector which senses motion of said vibratile elements in said driven direction to create a second drive component signal,*

*wherein said second reaction component signal and said second drive component signal are added by said summing means to generate a second pickoff signal which is phase displaced from said first pickoff signal by an amount proportional to said rate of turn of said apparatus.*

*20. Apparatus for measuring an angular rate of turn comprising:*

*a plurality of elongated vibratile elements,*

*drive means associated with said vibratile elements for controllably oscillating said elements in a driven direction;*

*said elements being responsive to said oscillating in said driven direction for oscillating in a reaction direction perpendicular to said driven direction by an amount controlled by an angular rate of turn of said apparatus, and*

*means for generating an output signal in response to said oscillations with said output signal having a phase shift controlled by said angular rate of turn of said apparatus.*

*21. A method for measuring an angular rate of turn of apparatus comprising the steps of:*

*controllably oscillating a plurality of elongated vibratile elements in a driven direction;*

*said elements being responsive to said oscillation in said driven direction for oscillating in a reaction direction perpendicular to said driven direction by an amount controlled by an angular rate of turn of said apparatus, and*

*generating an output signal in response to said oscillations with said output signal being phase shifted by an amount controlled by said angular rate of turn of said apparatus.*

*22. A method for measuring an angular rate of turn of apparatus comprising the steps of:*

*mounting a plurality of elongated vibratile elements on a base,*

*operating drive means associated with said vibratile elements for oscillating said elements in opposition to one another in a driven direction;*

*said elements being responsive to said oscillation in said driven direction to oscillate in a reaction direction by an amount proportional to said angular rate of turn of said apparatus,*

*said elements being affixed to said base such that the vibration effects of said oscillation of said elements are canceled for both said driven direction and said reaction direction of vibration of said elements, and*

*generating an output signal having a phase shift whose magnitude is indicative of said rate of turn.*

* * * * *